United States Patent [19]

Ritenour

[11] Patent Number: 4,645,992
[45] Date of Patent: Feb. 24, 1987

[54] ELECTRONICALLY CONTROLLED SERVOMOTOR LIMIT STOP

[75] Inventor: Roger L. Ritenour, Charlottesville, Va.

[73] Assignee: Sperry Corporation, New York, N.Y.

[21] Appl. No.: 685,706

[22] Filed: Dec. 24, 1984

[51] Int. Cl.[4] .............................................. G05F 1/08
[52] U.S. Cl. .................................... 318/469; 318/597;
318/257; 318/434; 318/430; 318/466; 318/626
[58] Field of Search ............... 318/317, 332, 430, 432,
318/433, 434, 257, 466, 467, 468, 599, 616, 617,
689, 282, 286, 469, 626, 628, 638

[56] References Cited

U.S. PATENT DOCUMENTS

| | | | |
|---|---|---|---|
| 3,369,160 | 2/1968 | Koppel et al. | 318/635 X |
| 3,551,770 | 12/1970 | Isaacs | 318/283 X |
| 3,657,623 | 4/1972 | Fludzinski | 318/326 |
| 4,002,960 | 1/1977 | Brookfield et al. | 318/432 X |
| 4,066,942 | 1/1978 | Bardwell et al. | 318/434 |
| 4,097,786 | 6/1978 | Lund | 318/282 |
| 4,250,441 | 2/1981 | Chapman et al. | 318/626 |
| 4,290,000 | 9/1981 | Sun | 318/434 X |
| 4,338,556 | 7/1982 | Hetzel | 318/283 X |
| 4,364,111 | 12/1982 | Jocz | 318/286 X |
| 4,394,607 | 7/1983 | Leminade | 318/469 X |
| 4,412,158 | 10/1983 | Jefferson et al. | 318/284 X |
| 4,467,250 | 8/1984 | Thomasson | 318/469 X |
| 4,531,081 | 7/1985 | Liesegany | 318/434 X |

Primary Examiner—William M. Shoop, Jr.
Assistant Examiner—Shik Luen Paul Ip
Attorney, Agent, or Firm—Howard P. Terry

[57] ABSTRACT

A drive circuit for servomotors that eliminates the need for microswitches to protect the motor when the system is driven to its limits of travel. The circuit monitors the current to the motor, identifies overload currents and terminates current flow to the motor when an overload occurs. The current flow is restored only when a reverse rotation command signal is received by the drive circuit.

7 Claims, 2 Drawing Figures

ELECTRONICALLY CONTROLLED SERVOMOTOR LIMIT STOP

BACKGROUND OF THE INVENTION

1. Field of the Invention

The present invention relates to drive circuits for servomotors and more specifically to a drive circuit in which the drive power is automatically inhibited when the servosystem is driven to its mechanical limits.

2. Description of the Prior Art

Servosystems are frequently designed to operate between specified limits of mechanical movement. Motion beyond these limits is restrained by mechanical stops. When the moving element in such systems reaches a limiting position, the servomotor is stalled and the drive current increases to a level that would destroy the motor. In order to protect the motor under such circumstances, microswitches are often employed in the limiting mechanism to terminate the power flow to the servomotor until the motor is commanded to reverse its direction of rotation.

The present invention provides means to reduce the cost and to increase the reliability of such systems by eliminating the need for the microswitches and their attendant wiring.

SUMMARY OF THE INVENTION

A servosystem drive circuit includes means for sensing instances when the servomotor drive current exceeds a preset threshold level for a given time, and means for terminating the flow of current until a sufficiently strong command signal attempts to reverse the direction of rotation of the servomotor.

DESCRIPTION OF THE PREFERRED EMBODIMENT

Figure 1:
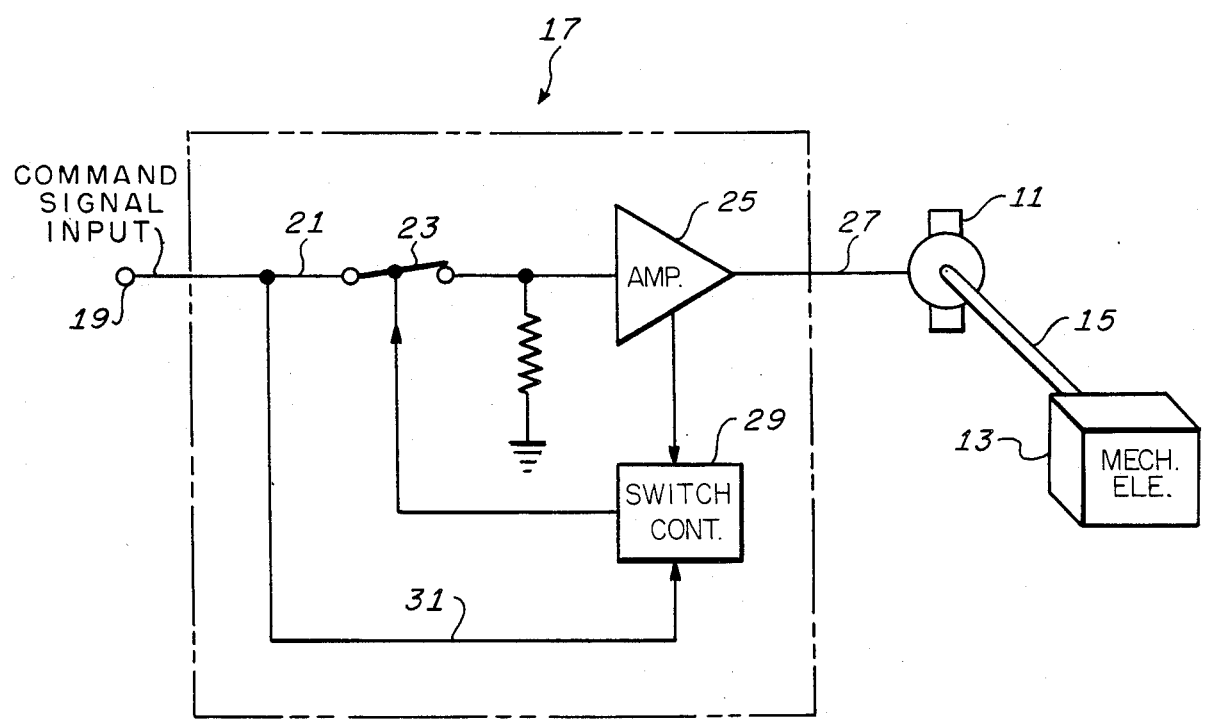
FIG. 1 is a block diagram useful in explaining the invention.

Referring now to FIG. 1, a servosystem employing the principles of the invention includes a DC servomotor 11, which is mechanically coupled to the mechanical elements 13 of the servosystem through the motor shaft 15. In accordance with standard practice, the mechanical elements 13 include stop elements which limit the extremes of system motion.

The drive system 17 for the motor receives appropriate command signals at an input terminal 19. These signals are passed through a line 21 and a normally closed switch 23 to a signal monitoring and amplifying means 25. The means 25 supplies the necessary electrical operating signals to the motor 11 through coupling means 27 and overload signals to switch controlling means 29.

The switch controlling means 29 serves to open the switch 23 when the means 29 receives a signal from the monitoring and amplifying means 25 which indicates that the mechanical system has reached one of its designated limits of travel.

The switch controlling means continues to maintain the switch in the open position until a reverse command signal received at terminal 19 is applied to the switch controlling means through the line 31.

Figure 2:
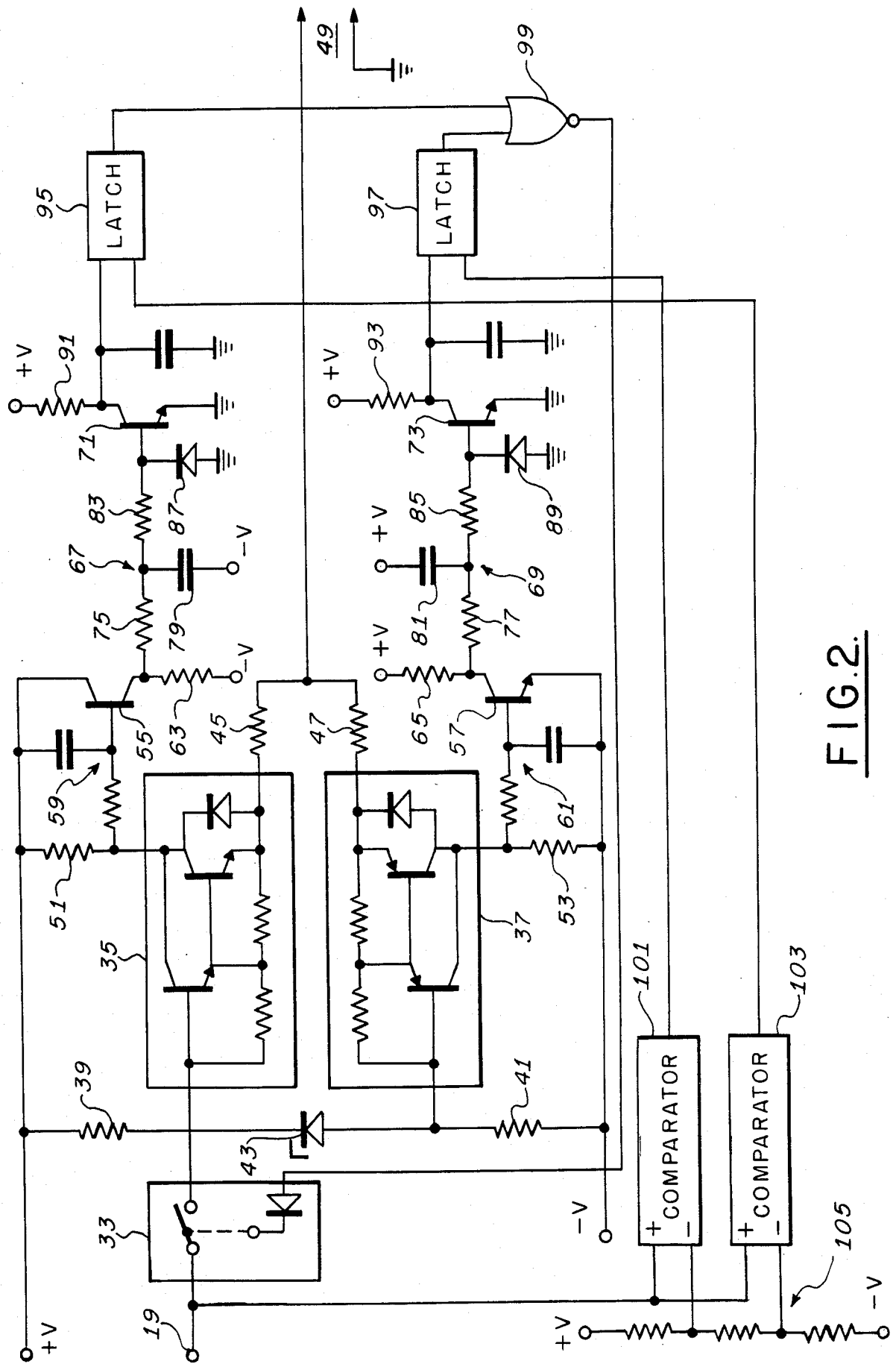
FIG. 2 is a circuit diagram illustrating a typical drive circuit employing the principles of the invention.

FIG. 2 represents a detailed diagram of the drive system 17 of FIG. 1.

Command signals applied to the input terminal pass through the switching means 33 which is maintained in the normally closed state, to amplifying means 35 and 37, which are biased by means of resistors 39 and 41 and diode 43 so as to provide no operating current to the servomotor when switching means 33 is open.

The amplifying means 35 and 37 typically may utilize commercially available integrated circuit such as 2N6055 and 2N6053 integrated circuits, respectively.

Amplifiers 35 and 37 are coupled through resistors 45 and 47 to output terminal 49, and comprise the basic motor amplifying means corresponding to amplifier 25 of FIG. 1. These amplifiers are further coupled to the system energy source through resistors 51 and 53. Voltages developed across these latter resistors are coupled to the base terminals of transistors 55 and 57 through the R-C networks 59 and 61, respectively, and comprise the current sensing means for the signal monitoring function.

The amplified current sensing signals appearing across collector resistors 63 and 65, respectively, are applied through coupling networks 67 and 69 to digitizing transistors 71 and 73. These coupling networks include R-C filter networks comprising series resistors 75, 83 and 77, 85 with the associated capacitors 79 and 81, as well as diodes 87 and 89 which clamp the signals to protect transistors 71 and 73 respectively.

The components in the aforementioned R-C network are selected to filter out extraneous pulses that may arise in the system and thereby prevent such pulses from affecting the digitizing transistors 71 and 73. Since the abnormally high currents encountered when the servomotor motion is blocked are relatively long term phenomena, the components in the network can be chosen to provide a considerable time delay thereby providing highly accurate identification of overload conditions in the signal being monitored.

The relatively slowly changing monitored signals are applied to the digitizing transistors 71 and 73 which are coupled to suitable voltage sources through collector resistors 91 and 93. These transistors serve as input elements to the switch controlling means designated as element 29 in FIG. 1. Effectively, these transistors translate the relatively slowly changing monitored signal into a digital one signal suitable for operating latching means 95 and 97.

The latching means typically may comprise commercially available integrated circuit latching devices such as the 74L500 and 74L502 integrated circuits.

Output signals from the latching circuits are applied to a NOR gate 99 and thence to the switching means 33. Typically, the switching means may be in the form of an integrated circuit containing amplifying means which serves to maintain the switching means in the closed state during normal operating conditions.

The switch is opended when either latch has been tripped. It will remain in that condition until reset.

It will be recalled that in the present context, when the servomechanism has reached a stop means and the switching circuit has shut off power flow to the servomotor, the power to the motor will remain interrupted until a sufficiently strong reverse command is applied to the system, and resets the tripped latch.

In the circuit of FIG. 2, latch resetting is accomplished by means of signals developed by comparators 101 and 103 acting in conjunction with voltage divider 105.

As depicted in FIG. 2, the non-inverting terminals of both comparators are connected to the input terminal 19, whereas the inverting terminals are connected to appropriate points on the voltage divider 105. The comparator 101 is connected to a more positive point on the voltage divider so as to establish a high threshold level for resetting the latch 95 whereas comparator 103 is referenced to a lower voltage so as to establish the low threshold level. The output signals of the comparator 101 and 103 generate reset signals for the latches 95 an 97, respectively, and serve to re-activate the servo-system when a sufficient reverse motor command signal is received at the input terminal 19, thus permitting the servosystem to back off its mechanical limit.

For purposes of discussion it is convenient to consider the drive circuit of FIG. 2 as containing two channels: the first or "high" limit channel including the amplifier 35, the coupling network 67 and the latch 95 together with the associated circuitry and the second or "low" limit channel including the amplifier 37, the coupling network 69, the latch 97, and the associated circuitry.

Consider now, the operation of the circuit of FIG. 2. Assume that an input command signal is causing the servomotor to move the system toward the "high" limit of its travel. When this limit is reached, the motor will be stalled and abnormally high currents will be drawn by the motor. This abnormally high current will pass through the amplifying means 35 and the associated collector resistor 51 so as to increase the voltage across this resistor. This, in turn, will cause the transistor 55 to conduct, thereby beginning to charge the timing capacitor 79. If the amplifier 35 remains "ON" long enough, it will charge the capacitor 79 sufficiently to switch the transistor 71 "ON" so as to produce a digital signal suitable to set the latch 95 and coupled a logic "1" or NOR gate 99 thereby opening the switch 33.

When the switch 33 opens, the input to the amplifying means 35 and 37 will be determined solely by the elements in the voltage divider including the resistors 39 and 41 which are selected to bias the amplifying means "OFF" thereby terminating the servomotor drive signal.

The system will remain in this inhibited or limit stopped mode until the command signal at the input 19 decreases sufficiently to cause the comparator 103 to reset the latch 95. This occurs when the command signal is of sufficient reverse magnitude to apply a voltage to the non-inverting terminal of the comparator which is more negative than the threshold voltage applied to the inverting input terminal of that comparator.

When the latch 95 is reset, the switching means 33 closes, the servomotor is actuated and the mechanical system backs away from the mechanical limit.

When the servo-system reaches the opposite mechanical ("LOW") limit, the transistors in amplifying means 37 will be biased on so as to permit sufficient current to flow through the collector resistor 53 to trigger the lower limit stop in the same fashion as that previously described for the high limit situation.

The lower limit stop is reset by comparator 101 when an input command signal is sufficiently high to overcome the reset threshold applied to the inverting input of that comparator.

It will be appreciated by those skilled in the art that the principles of this invention may be utilized in D.C. servosystems, pulse width modulated systemsm and A.C. servo systems.

While the invention has been described in its preferred embodiments, it is to be understood that the words which have been used are words of description rather than of limitation and that changes within the purview of the appended claims may be made without departure from the true scope and spirit of the invention in its broader aspects.

I claim:

1. A drive circuit for a servomotor operating in a servosystem employing mechanical travel limit stops comprising:
    means for receiving command signals;
    means coupled to said receiving means and having output means for coupling to said servomotor for amplifying said command signals;
    means coupled to said amplifying means for monitoring current to said servomotor;
    means coupled to said monitor means for identifying servomotor overload currents;
    means coupled between said receiving means and said amplifying means and further coupled to said identifying means for terminating command signals to said amplifying means when a servomotor overload current is identified; and
    means coupled to said receiving means and said terminating means for restoring command signals to said amplifying means when a reverse direction command signal which exceeds a preselected threshold level is received.

2. A drive circuit for a servomotor in accordance with claim 1 wherein said terminating means includes:
    switch means coupled between said receiving means and said amplifying means and having selectable first and second states, said first state for coupling said receiving means to said amplifying means and said second state for decoupling said receiving means from said amplifying means; and
    latch means coupled to said switch means and said monitor means for providing a first signal to said switch means to select said first state when said monitor does not identify an overload current and for providing a second signal to said switch means to select said second state when said monitor means identifies an overload current.

3. A drive current for a servomotor in accordance with claim 2 wherein said terminating means further includes:
    means for providing threshold signals; and
    means coupled to said threshold signal means, said receiving means, and said latch means for providing a reset signal to said latch means, after an overload current condition, when a reverse command signal at said receiving means achieves a predetermined threshold signal, thereby causing said latch means to couple said first signal to said switch means.

4. A drive circuit for a servomotor operating in a servosystem employing mechanical travel limit stops comprising;
    means for receiving command signals;
    first and second channels each coupled to said receiving means for controlling said servomotor in response to received command signals;
    means included in said first and second channels for monitoring current to said servomotor;

means coupled to said monitoring means for identifying servomotor overload currents in each of said first and second channels;

means coupled between said receiving means and said first and second channels and further coupled to said identifying means for terminating said command signals when said identifying means detects servomotor overload current; and means coupled to said receiving means and said terminating means for restoring command signals to said first and second channels in response to a reverse direction command signal which exceeds a preestablished threshold level.

5. The drive circuit of claim 4 wherein said identifying means comprises a resistor-capacitor network which blocks rapidly changing spurious pulses but passes signals indicative of servomotor overload currents.

6. The drive circuit of claim 5 wherein said terminating means includes:

digitizing means coupled to said resistor-capacitor network for providing a digital one when said capacitor is charged to a predetermined voltage by signals indicative of servomotor overload currents;

latching means coupled to said digitizing means for providing a termination signal in response to said digital one; and switching means coupled between said receiving means and said first and second channels, and further coupled to said latching means for terminating said command signals to said first and second channels in response to said termination signal.

7. The drive circuit of claim 6 wherein said restoring means includes voltage comparator means coupled to reset input terminals of said latching means and to receive said command signals for providing reset signals to said latching means in response to a received reverse command signal that exceeds a predetermined level, said reset signal resetting said latching means such that said switching means is reset to couple said receiving means to said first and second channels.

* * * * *